United States Patent
Chang et al.

(10) Patent No.: US 9,767,070 B2
(45) Date of Patent: Sep. 19, 2017

(54) STORAGE SYSTEM WITH A MEMORY BLADE THAT GENERATES A COMPUTATIONAL RESULT FOR A STORAGE DEVICE

(75) Inventors: Jichuan Chang, Mountain View, CA (US); Kevin T Lim, Ann Arbor, MI (US); Parthasarathy Ranganathan, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1450 days.

(21) Appl. No.: 12/613,537

(22) Filed: Nov. 6, 2009

(65) Prior Publication Data
US 2011/0113115 A1   May 12, 2011

(51) Int. Cl.
G06F 15/167 (2006.01)
G06F 15/78 (2006.01)

(52) U.S. Cl.
CPC ........ *G06F 15/7803* (2013.01); *G06F 15/786* (2013.01); *G06F 15/7857* (2013.01)

(58) Field of Classification Search
CPC ............... G06F 15/786; G06F 15/7857; G06F 15/7839; G06F 15/7835; G06F 15/7846; G06F 15/7853; G06F 15/785
USPC ......................................................... 709/213
See application file for complete search history.

(56) References Cited

U.S. PATENT DOCUMENTS

| | | | |
|---|---|---|---|
| 2004/0210795 A1* | 10/2004 | Anderson | 714/6 |
| 2006/0124730 A1* | 6/2006 | Maloney | 235/379 |
| 2006/0282618 A1* | 12/2006 | Thompson et al. | 711/118 |
| 2007/0101074 A1* | 5/2007 | Patterson | 711/156 |
| 2007/0124474 A1* | 5/2007 | Margulis | 709/226 |
| 2008/0010435 A1* | 1/2008 | Smith et al. | 712/10 |
| 2011/0078679 A1* | 3/2011 | Bozek et al. | 718/1 |

* cited by examiner

*Primary Examiner* — Joseph Greene
(74) *Attorney, Agent, or Firm* — Law Office of Phillip Scott Lyren

(57) ABSTRACT

One embodiment is a storage system having one or more compute blades to generate and use data and one or more memory blades to generate a computational result. The computational result is generated by a computational function that transforms the data generated and used by the one or more compute blades. One or more storage devices are in communication with and remotely located from the one or more compute blades. The one or more storage devices store and serve the data for the one or more compute blades.

14 Claims, 7 Drawing Sheets

STORAGE SYSTEM WITH A MEMORY BLADE THAT GENERATES A COMPUTATIONAL RESULT FOR A STORAGE DEVICE

CROSS-REFERENCE TO RELATED APPLICATIONS

This patent application is related to PCT patent application entitled "Organizing and Managing a Memory Blade with Super Pages and Buffers" filed on 29 Jun. 2009 and having Ser. No. PCT/US2009/049041; and PCT patent application entitled "Hypervisor-Based Management of Local and Remote Virtual Memory Pages" filed on 29 Jun. 2009 and having Ser. No. PCT/US2009/049036, both applications being incorporated herein by reference.

BACKGROUND

Blade servers are computer servers with a modular design that minimizes the use of physical space. Many components are removed from the blade servers to save space and reduce power consumption while still having functional components and computing power. Individual blades are often arranged in a blade enclosure and coupled together to provide various computing services.

The growth in the use of blade computers has led to ever increasing challenges in efficiently managing memory expansion, sharing across the multiple blades, and providing storage/networking related interfaces and optimizations.

DETAILED DESCRIPTION

Figure 1:
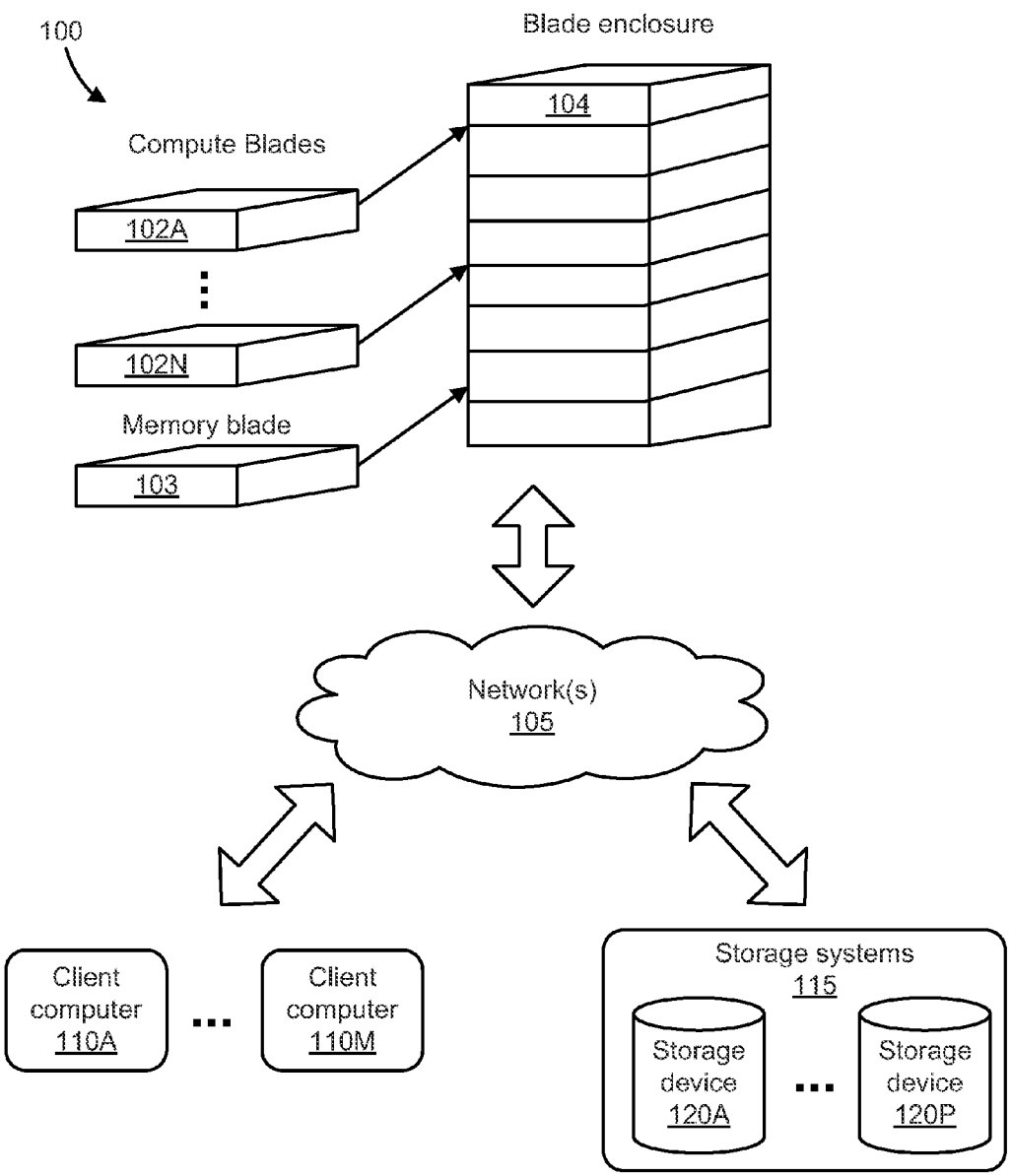
FIG. 1 shows a storage system with a memory blade and a plurality of compute blades in a network environment according to an example embodiment.

Embodiments relate to systems, methods, and apparatus that use a memory blade as a staging appliance for compute blades. The memory blade includes hardware and software that perform various functions for the compute blades.

As used herein and in the claims, a "staging appliance" is a memory blade that performs computational functions on data from a compute blade and stores the data on a remote storage device. In one embodiment, the computational functions transform the data, which can be locally cached in a cache in the memory blade.

Memory blades provide memory expansion and sharing across multiple compute blades with each compute blade using extra memory capacity in the memory blade to increase performance between its own local storage system and its central processing unit (CPU). Memory blades in accordance with an example embodiment also provide a staging appliance between the multiple compute blades and remote storage systems in communication with the compute blades.

Remote storage systems are often used for backup, disaster recovery, mobility in cloud computing, and other tasks. Storing to such systems, however, is relatively slow, especially when data is transferred over a wide area network (WAN) from the compute blades to the storage devices. One embodiment addresses this issue by situating a memory blade between the compute blades and the remote storage devices. The memory blade performs functions for the computer blades and thus reduces remote data access amount and frequency.

In one embodiment, data is backed up and recovered between local and remote sites (for example, between a local datacenter and a remote datacenter). Data is backed up using a process of de-duplication, which uses in-memory fingerprints to identify and remove duplicated data chunks already stored at the remote storage site. The memory blades provide additional memory or storage for the compute blades and provide both an increase in scalability (for example, an increase in a number of servers or amount of data being protected) and an increase in capacity to discover duplicate or redundant data stored at the local and remote sites (hence further reducing the amount of data being transferred to the storage devices).

One embodiment provides the memory blade with special-purpose hardware acceleration functions, such as hashing key generation and hash table lookup that are tailored for fingerprinting and content-based data retrieval. A hashing accelerator is used for both computing and searching footprints and significantly reduces hardware costs and power compared to using a general purpose processor. The memory blade further reduces data transfer bandwidth by using an accelerator to compress data chunks before sending to remote storage.

Encryption functions can also be included on the memory blade. By way of example, such encryption services can be used to improve security when transferring data to a public storage system.

In one embodiment, the memory blade locally caches copies of fingerprints and chunks. Performance is increased when attempting to retrieve data from remote storage since some of this data is already locally stored. Furthermore, when recovering remotely stored data, the memory blade retrieves the sequence of fingerprints and attempts to get chunks from local cache whenever it is locally available. This local cache can be implemented either in the memory housed by the memory blade, or local storage devices that are much faster and less expensive than requesting data from remote storage systems. After the data is recovered in the memory blade, its large memory capacity can enable high-performance data-intensive computing such as search and E-Discovery (i.e., discovery of electronic documents stored in memory). By utilizing data and task similarity across multiple requesting compute blades, the memory blade can further improve performance to enable challenging applications, such as video streaming and ad-insertion.

FIG. 1 shows a storage or computer system 100 with a memory blade 103 and a plurality of compute blades 102A-102N in a network environment according to an example embodiment. The memory blade and compute blades are located in a blade enclosure or blade rack 104 and are in communication with a plurality of client or host computers 110A-110M and one or more storage systems 115 through one or more networks 105, such as the internet, an intranet, a Wide Area Network (WAN), a Local Area Network (LAN). The storage systems 115 (such as local and remote datacenters) include a plurality of storage devices 120A-120P.

As used herein and in the claims, a "blade" or "compute blade" is a standardized electronic computing module that is plugged in or connected to a computer or storage system. A blade enclosure provides various services, such as power, cooling, networking, various interconnects and management service, etc for blades within the enclosure. Together the individual blades form the blade system. The enclosure (or chassis) performs many of the non-core computing services found in most computers. Further, many services are provided by the enclosure and shared with the individual blades to make the system more efficient. The specifics of which services are provided and how vary by vendor.

As used herein and in the claims, a "memory blade" is a device for managing a plurality of memory devices that are utilized by a compute blade. Example memory devices include Static Random Access Memory (SRAM), Dynamic Random Access Memory (DRAM), Electrically Erasable Programmable Read-Only Memory (EEPROM), flash, other Main Memory implementation (e.g., magnetic, flash or optically based memory), or other suitable memory.

Further, as used herein and in the claims, a "storage device" is any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

Figure 2:
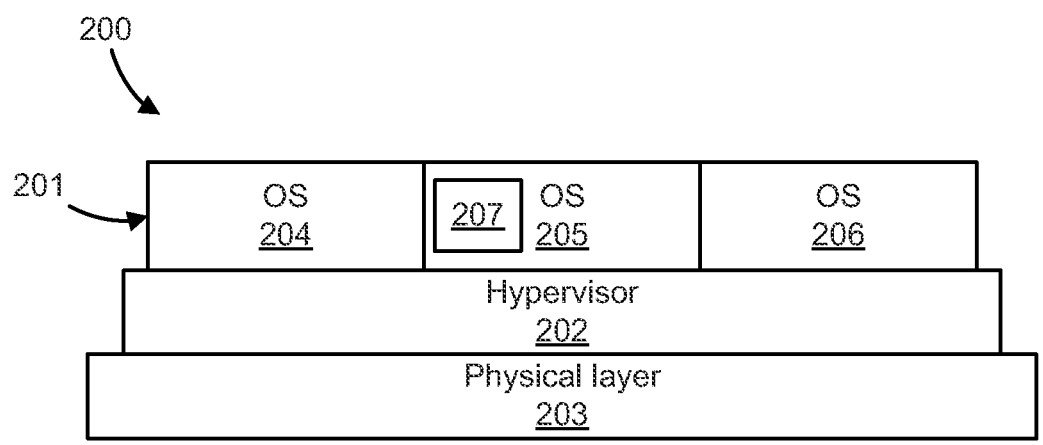
FIG. 2 shows a logical design of a compute blade according to an example embodiment.

FIG. 2 shows a logical design of a compute blade 200 according to an example embodiment. The compute blade 200 includes an operating system layer 201 that resides upon a hypervisor 202, which, in turn, resides upon a physical layer 203. The operating system layer 201 includes one or more operating systems 204-206 acting as Virtual Machines (VMs). These VMs may be implemented using any one of a number of virtualization schemes including Full Virtualization, Hardware-Assisted Virtualization, Partial Virtualization, Paravirtualization, and Operating System-Level Virtualization. Suitable operating systems include, for example, the LINUX™ operating system, Microsoft Corporation's Windows™ operating system, Sun Corporation's Solaris™ operating system, the UNIX™ operating system, or some other suitable operating system known in the art. The hypervisor 202 may be configured as a Type 1, Type 2, or Hybrid-Type hypervisor. The physical layer 203 may be a computer system. A balloon driver 207 is included as part of this operating system 205. In some example embodiments, the balloon driver 207 is used to allocate and de-allocate virtual memory for the operating system 205. This allocation and de-allocation is performed in the operating system 205 by the balloon driver 207 working in conjunction with the hypervisor 202.

As used herein and in the claims, a "hypervisor" is computer software/hardware platform virtualization software that enables multiple operating systems to run concurrently on a single host computer. Type 1 hypervisors run directly on the host's hardware as a hardware control and guest operating system monitor. Type 2 hypervisors run within a conventional operating system environment.

Figure 3:
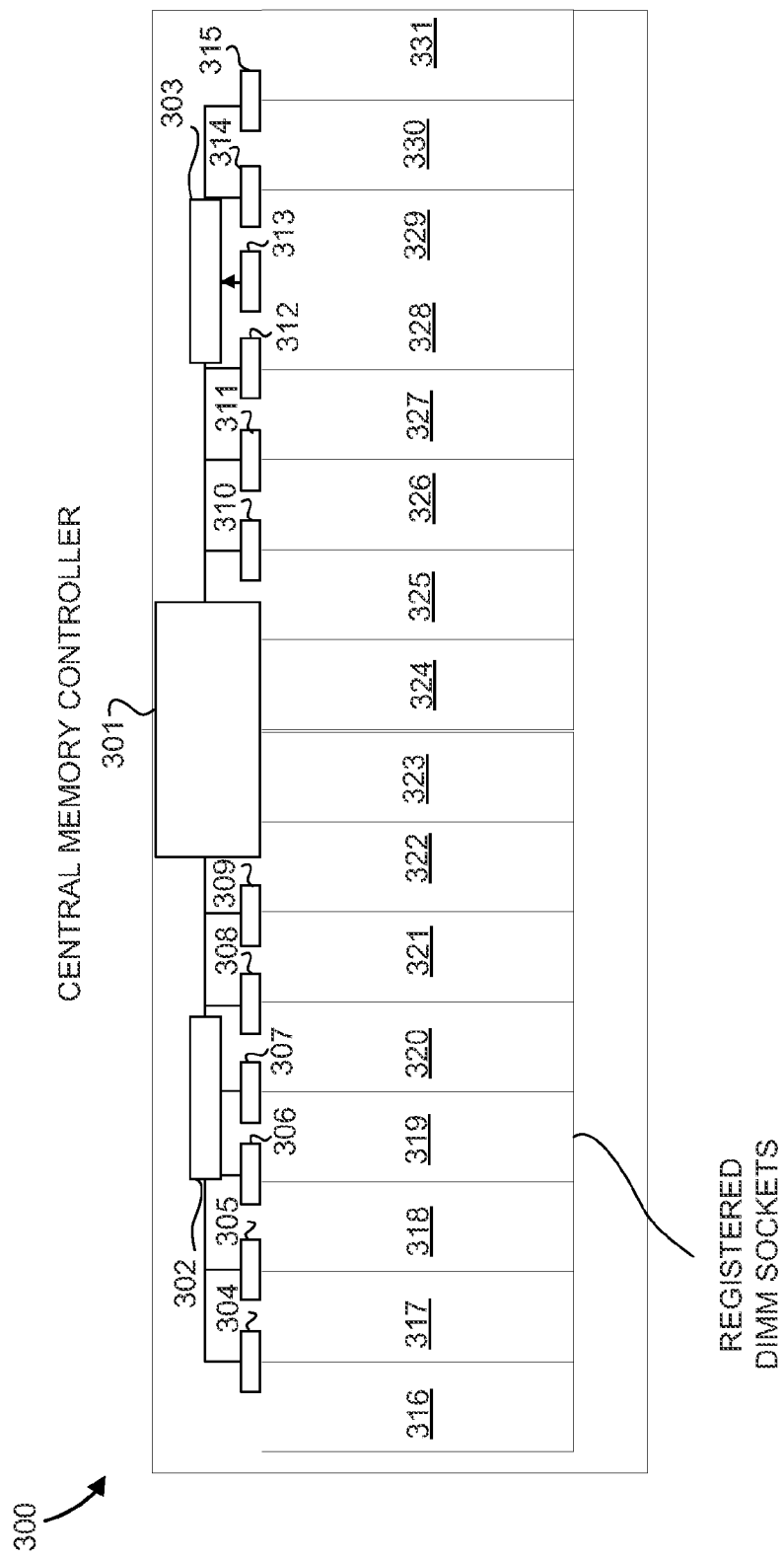
FIG. 3 shows a memory blade according to an example embodiment.

FIG. 3 shows a memory blade 300 according to an example embodiment. Illustrated is a plurality of the central memory controllers that manage a plurality of buffers. These buffers, in turn, manage or control a plurality of additional buffers, or DIMM sockets. The central memory controller, buffers, and Dual Inline Memory (DIMM) sockets are operatively connected via a plurality of memory channels. The memory blade 300 shows a central memory controller 301 that is operatively connected to the buffer 302 and the buffer 303. The buffer 302, in turn, is operatively connected to buffers 304 through 309. Buffer 303 is operatively connected to buffers 310 through 315 via a memory channel. The buffer 302 manages the buffers 304 through 309, while the buffer 303 manages the buffers 310 through 315. In some example embodiments, the various buffers (e.g., 304 through 309 and 310 through 315) are combined into one single logical buffer. Further, illustrated are DIMM sockets 316 through 317 that include physical memory managed by the buffer 304. Moreover, the DIMM sockets are managed by respective buffers, such as sockets 317-318 managed by buffer 305, sockets 318-319 managed by buffer 306, sockets 319-320 managed by buffer 307, sockets 320-321 managed by buffer 308, sockets 321-323 managed by buffer 309, sockets 324-326 managed by buffer 310, sockets 326-327 managed by buffer 311, sockets 327-328 managed by buffer 312, sockets 328-329 managed by buffer 313, sockets 329-330 managed by buffer 314, and sockets 330-331 managed by buffer 315. The memory residing as a part of these various DIMM sockets may be DRAM memory, flash based memory, or some other suitable type of physical memory. In some example embodiments, the memory blade 103, represented as a half-height memory blade, can support thirty-two Double Data Rate (DDR) ⅔ memory modules.

In some example embodiments, multiple on-board repeater buffers 304 through 315 are implemented with each buffer acting as an independent memory controller, or manager, for a subset of the memory modules. As illustrated in FIG. 3, a single buffer may be used to manage 2-4 memory modules. The management duties for a buffer (e.g., buffers 304 through 315) include receiving memory operation commands and data from a central memory controller (e.g., central memory controller 301), and forwarding the data to individual memory modules (e.g., memory modules 316 through 331). Responses are sent from one more of the memory modules 316 through 331, via the buffers 304 through 315, to the central memory controller 301.

Figure 4:
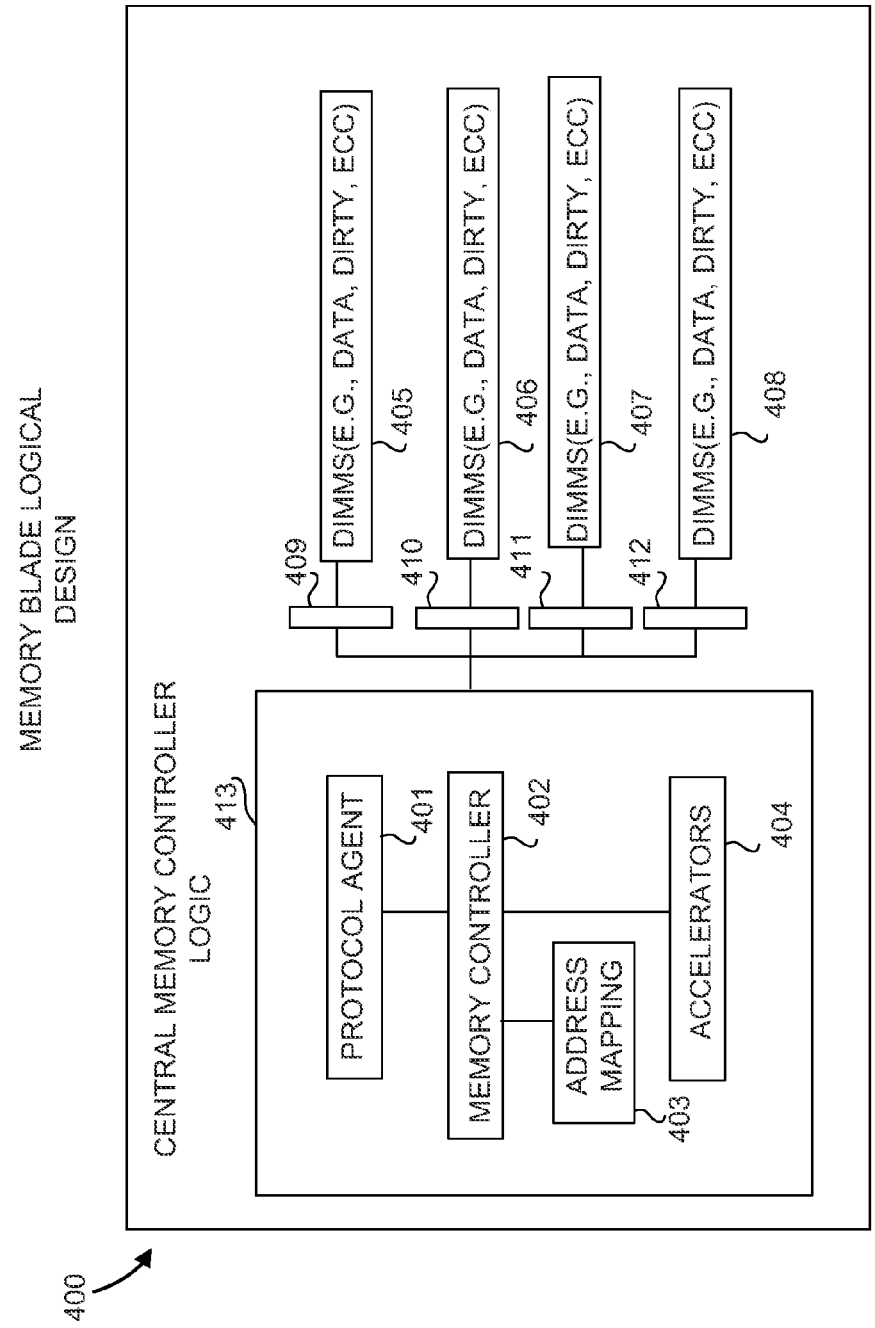
FIG. 4 shows a memory blade logical design with various logic modules according to an example embodiment.

FIG. 4 shows a memory blade logical design 400 with various logic modules according to an example embodiment. The memory blade 400 includes a central memory controller, represented at 413, as four sub-modules. A protocol agent 401 is shown that communicates with the compute blades (e.g., compute blades 101A-101N in FIG. 1). This communication may be via some type of protocol including Peripheral Component Interconnect Express (PCIe), Hypertransport™, QuickPath Interconnect™ (QPI), or some other suitable protocol. Further, this communication includes the packing/unpacking of requests and responses using the aforementioned protocols. Request that cannot be satisfied directly by the memory blade are forwarded to other memory blades or compute blades. A requested forwarded to other memory blades is referenced herein as a memory-side request. A memory controller 402 is illustrated that handles read or write requests. In some example embodiments, these read and write requests are data pairs that include a blade ID, and a compute blade machine address (e.g., the SMA). An address mapping module 403 is implemented to locate the physical location of the data (denoted as RMMA) on the memory blade as well as check whether the read and write requests have the appropriate permissions. Where the appropriate permission exists, a requested access is permitted and an RMMA is retrieved by the address mapping module 403. The RMMA is forwarded by the memory controller 402 to the corresponding repeater buffer via a memory channel. The buffer responds to this request through performing the necessary encoding and decoding operation for the memory module upon which the target data is located. An accelerator module 404 is illustrated that can be implemented either within a memory controller, or proximate to the controller, or a repeater buffers to do special purpose computation on the data. This accelerator can be a general purpose processor or CPU, special purpose processor, graphical processing unit, Application-Specific Integrated Circuit (ASIC), or a Field-Programmable Gate Array (FPGA). Special purpose computational functions include the execution of hashing algorithms (e.g., the Secure Hashing Algorithm (SHA)), compression/decompression algorithms, encryption/decryption algorithms (e.g., the Advanced Encryption Standard (AES)), or Error Correction Coding (ECC)/chipkill coding. Various DIMMs 405 through 408 are also shown, where these DIMMs are memory modules connected to respective buffers 409-412.

As used herein and in the claims, an "accelerator" or "hardware accelerator" is specialized hardware that is designed to perform some computational function instead of implementing the functionality via software running on a general purpose CPU. The hardware performing the function is in a separate unit from and interfaced with the CPU.

Figure 5:
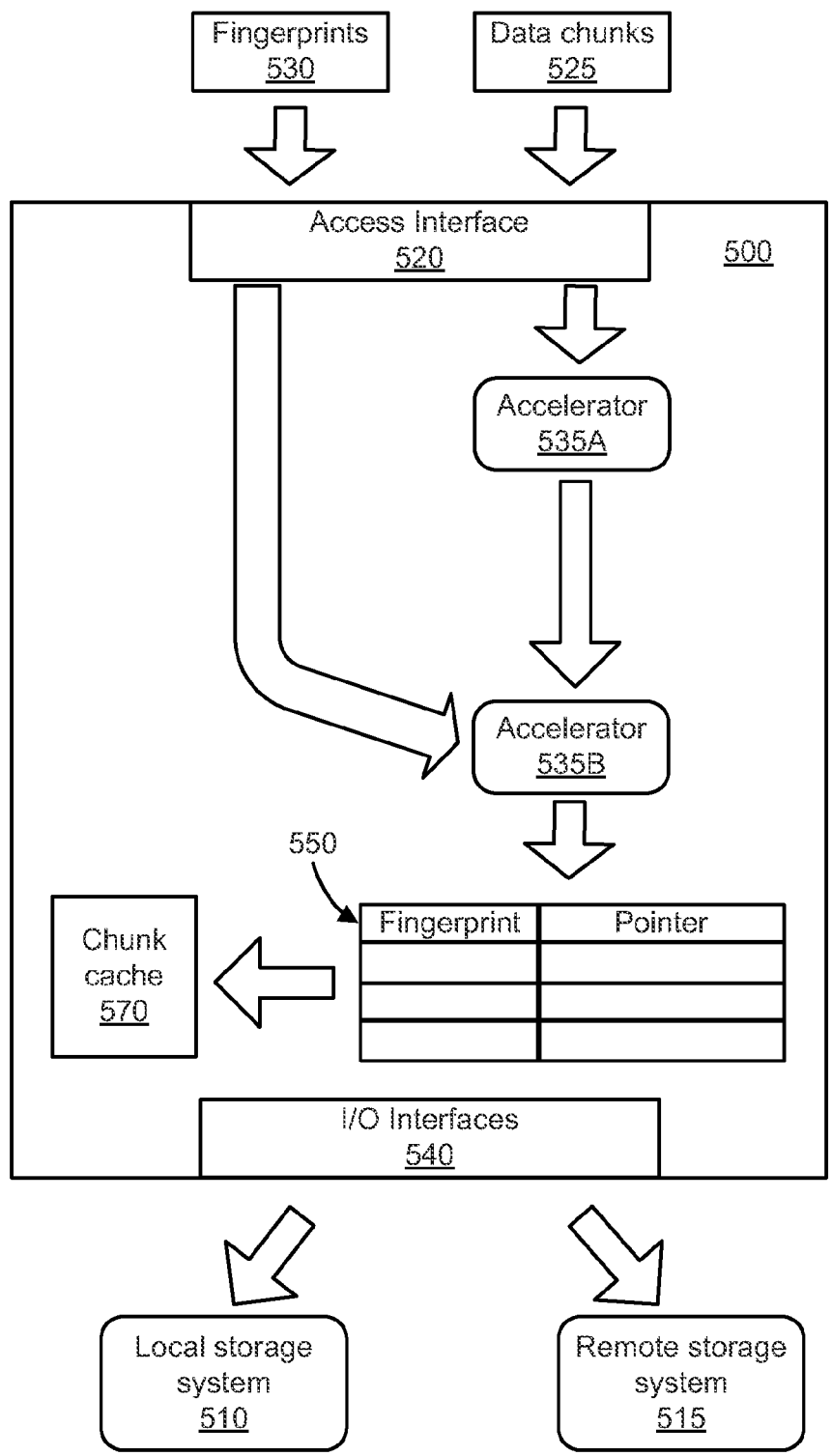
FIG. 5 shows a memory blade coupled to local and remote storage systems according to an example embodiment.

FIG. 5 shows a memory blade 500 coupled to a local storage system 510 and a remote storage system 515 according to an example embodiment.

The memory blade 500 includes an access interface 520 that receives data chunks 525 and their associated hashing keys or fingerprints 530. The memory blade includes special-purpose hardware accelerators 535A and 535B (such as accelerators performing hashing, compression, and encryption functions) and input/output (I/O) interfaces 540 to the local storage system 510 and the remote storage system 515.

The memory blade 500 includes a hash table 550 that includes <fingerprint, storage_pointer> pairs. The fingerprints summarize the content of data chunks and the storage pointers record location information of the data chunks. Special hashing function hardware is included to efficiently generate the fingerprints and the hash keys for fingerprints. In one embodiment, the chunks of data are cached in memory or local storage 570 under the memory blade 500 to speedup data access.

In one example embodiment, the interface includes of the following commands:

(1) <fingerprint, storage_pointer>=put (chunkMetadata, chunkData, options): This command sends a chunk of data (identified by chunkMetadata such as fileID and offset) to the memory blade 500, which generates its fingerprint. The options can include flags such as (a) using compression and (b) using encryption. If the generated fingerprint matches an existing chunk, then only a pointer to the existing chunk is stored together with chunkMetadata; otherwise, a new pair of <fingerprint, pointer> will be inserted into the hash table and the actual data chunk will be stored. In either case, the memory blade returns the <fingerprint, pointer> pair as the result.

(2) <validData, chunkData>=get (fingerprint): This command retrieves the data chunk based on its fingerprint, by first searching in local caches (either in the memory blade or local storage). If the data does not exist in caches, the memory blade 500 will set the return value of validData as false.

Memory blades in accordance with example embodiments can vary compute power and I/O capabilities to integrate with various compute and I/O subsystems. A first example embodiment re-uses an existing PCIe interface and changes a command packet field to indicate this is an appliance-specific command. The compute blade side also incorporates this new command type in its request packets. One or multiple compute blade combined with the memory blade will form the staging appliance.

A second example embodiment is a stand-alone appliance with general purpose server functionality to support standard network and storage I/O interface. The memory blade can understand network socket and file system semantics, and hence directly support high-level API such as memcached.

Both example embodiments support flexible interaction between compute and memory blades and allow upgrade of algorithms and storage architectures. This is accomplished by decoupling the computing tasks that are suitable for the general purpose server platform from data procesing and access functions suitable for the memory blade.

Figure 6A:
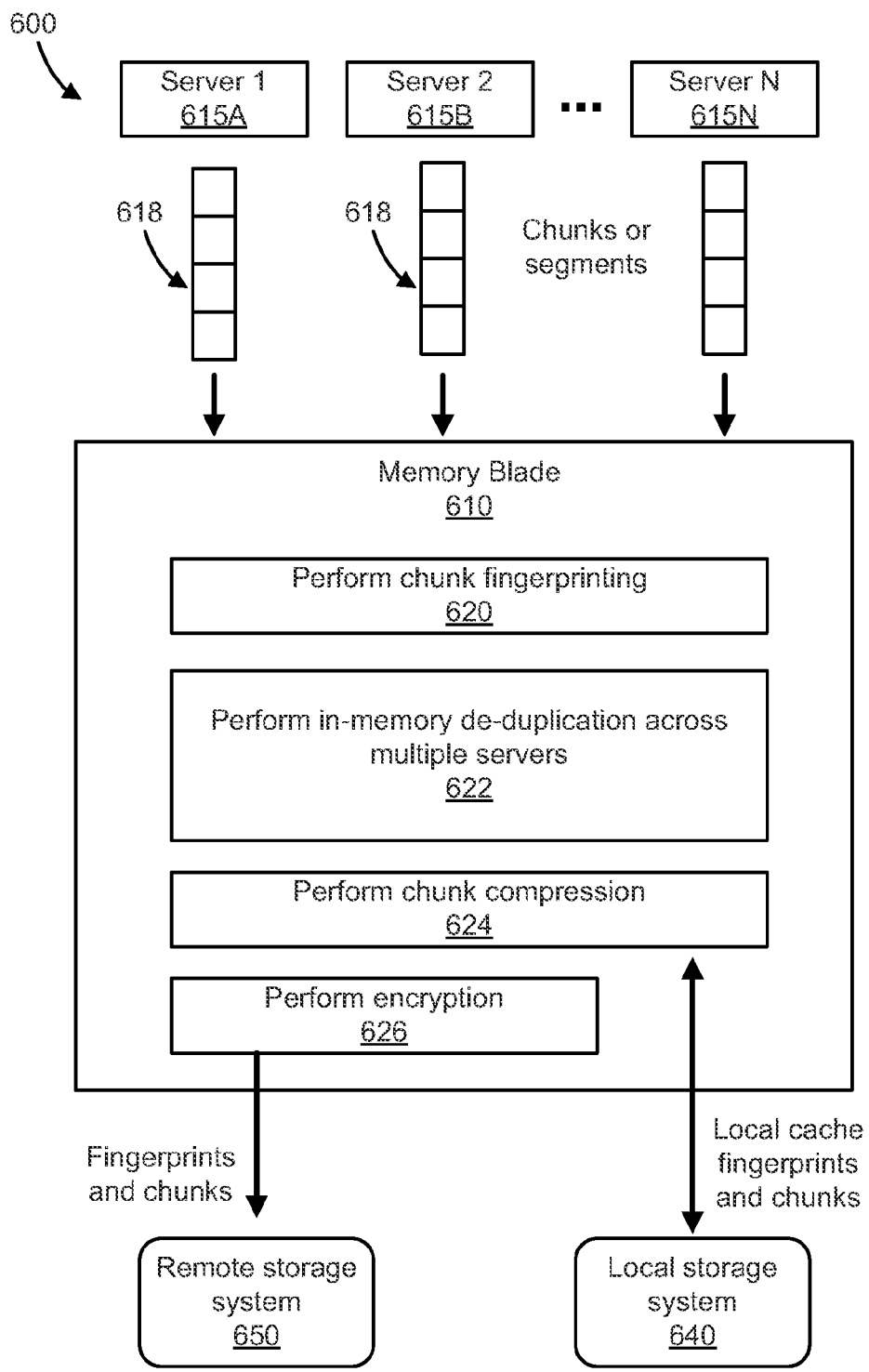
FIG. 6A shows a storage system with a memory blade performing a first set of multiple functions according to an example embodiment.

FIG. 6A shows a storage system 600 with a memory blade 610 performing a first set of multiple functions according to an example embodiment. The functions (shown in blocks 620, 622, 624, and 626) can be implemented in hardware, firmware, and/or software in the memory blade (for example, as one or more accelerators or modules).

The storage system 600 includes a plurality of compute blades or servers 615A, 615B, to 615N in communication with the memory blade 610. The servers send chunks or segments of data 618 to the memory blade.

According to block 620, the incoming chunks or segments 618 are fingerprinted. One embodiment uses a fingerprint algorithm. As used herein and in the claims, "fingerprinting" is a procedure that maps a large data item (such as a computer file) to a much shorter bit string (i.e., its fingerprint) that uniquely identifies the original data. An example algorithm is Rabin's fingerprinting algorithm.

According to block 622, in-memory de-duplication occurs across multiple servers. As used herein and in the claims, "de-duplication" or "deduplication" is a process of finding, reducing, and eliminating or deleting redundant data. Deduplication increases capacity optimization and single-instance storage.

According to block 624, the chunks are compressed. Data compression is a process of encoding information using fewer bits than an un-encoded representation would use through use of specific encoding schemes. Compressing the data reduces storage space and transmission bandwidth.

The compressed fingerprints and chunks are stored in local storage or local cache 640 of the memory blade.

According to block 626, the chunks are encrypted. Encrypting data is a process of transforming information using an algorithm (cipher) to make the data unreadable to anyone except those possessing a cipher key.

The encrypted fingerprints and chunks are transmitted to a remote storage system 650, such as a remote datacenter.

Figure 6B:
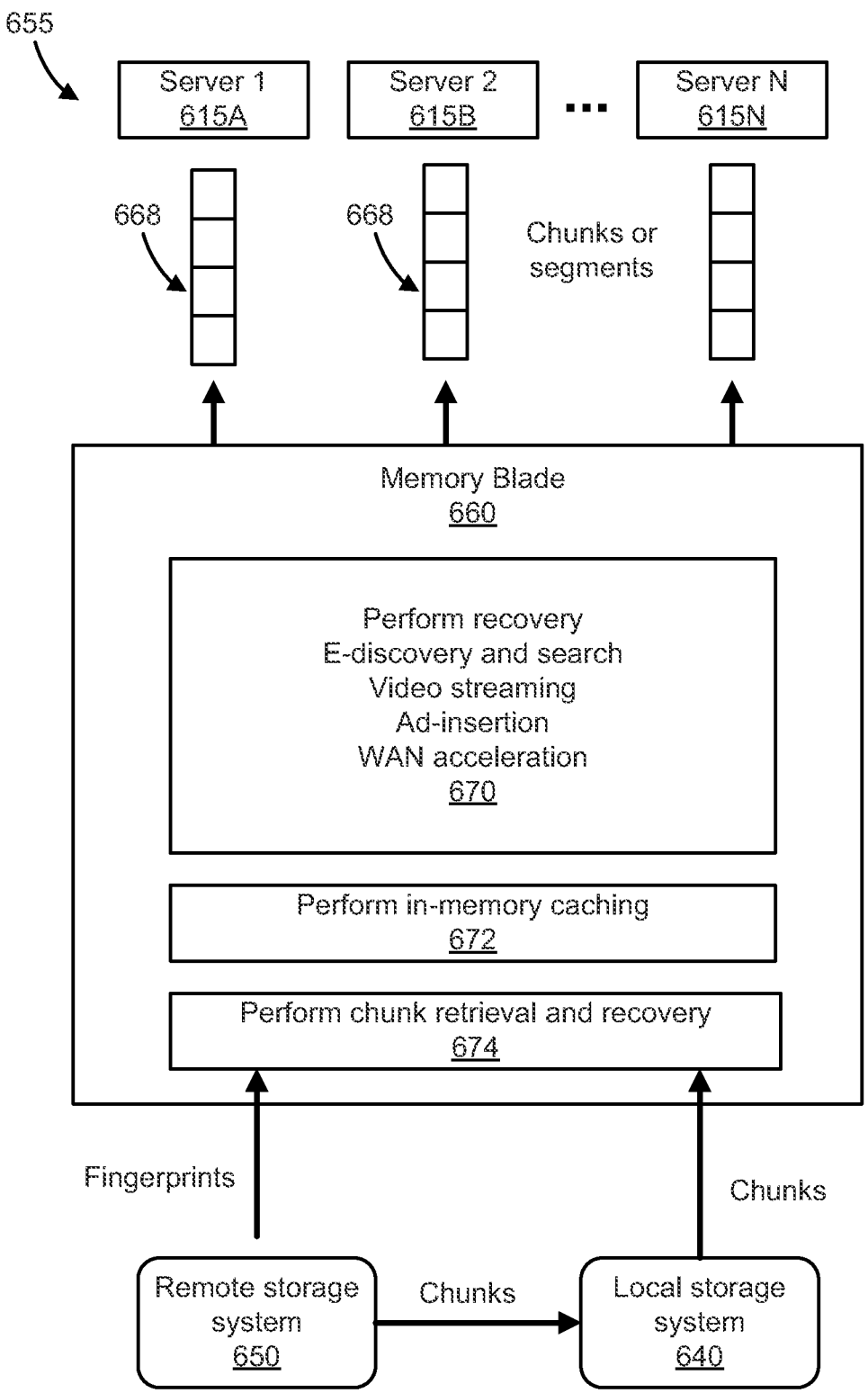
FIG. 6B shows a storage system with a memory blade performing a second set of multiple functions according to an example embodiment.

FIG. 6B shows a storage system 655 with a memory blade 660 performing a second set of multiple functions according to an example embodiment. The functions (shown in blocks 670, 672, and 674) can be implemented in hardware, firmware, and/or software in the memory blade (for example, as one or more accelerators or modules).

The storage system 655 includes a plurality of compute blades or servers 615A, 615B, to 615N in communication with the memory blade 660. The servers receive chunks or segments of data 668 previously sent to the memory blade and stored at the local storage system 640 or remote storage system 650.

When recovering remotely stored data, the memory blade retrieves the sequence of fingerprints and attempts to obtain chunks from local cache. Block 674 shows the memory blade performing chunk retrieval and recovery, and block 672 shows the memory blade performing in-memory caching. If the data is not locally cached, the memory blade appliance will request and transfer data from remote storage systems. According to the cache management policy, the newly arrived data can be included in the local cache to avoid future remote requests.

After the data is recovered in the memory blade, various data computations can be performed. For example, block 670 shows recovery, e-discovery and search, video streaming, ad-insertion, WAN acceleration, etc.

The embodiments of FIGS. 6A and 6B provide the memory blade as a staging application between multiple servers or compute blades and remote storage. In one embodiment, some memory is provided locally for the CPU while some memory is provided on a separate or different device, such as an I/O device that can be addressed as part of the physical memory address of the local memory. Memory is split into two levels: local memory or main memory with relatively fast access time since it is close to the CPU and remote memory located on the memory blade with relatively slower access time since it is farther from the CPU. The remote memory on the memory blade, however, is still much faster than disk and making requests to remote storage systems via a network.

When data is accessed on the remote memory blade, data is swapped with a local page. Most frequently used pages are kept local (for example, stored in main memory or cache memory proximate the CPU). One embodiment uses a hypervisor to isolate the memory blade from local programs. The hypervisor is transparent to the OS and other applications and enables page swapping between the local memory and the memory blade.

The memory blade also includes hardware and software to perform specialized functions (such as hashing pages, generating signatures, compression, decompression, de-duplication, encryption, etc.) so the memory blade can function as a staging appliance between local storage and remote storage. For example, local storage can include a first datacenter, and remote storage can include a second datacenter. Data from the first datacenter is sent to the memory blade where the specialized functions are performed. The data is then transmitted to the second datacenter. The memory blade thus functions as a staging appliance between the two datacenters. By performing these functions, the memory blade reduces the amount of data traffic (i.e., information being transmitted) between the two datacenters and power used to perform such tasks. Performance is also increased since the memory blade provides large storage and computations for the first datacenter.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit the invention.

In the various embodiments in accordance with the present invention, embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices; including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A storage system in communication with one or more remote storage devices, the storage system comprising:
   one or more compute blades to process data chunks;
   one or more memory blades coupled to the one or more compute blades, the one or more memory blades to provide additional memory storage for the one or more compute blades, the one or more memory blades including a memory controller to perform operations comprising:
      receiving data chunks from the one or more compute blades;
      generating associated fingerprints for the data chunks;
      compressing one or more of the data chunks and transferring the one or more compressed data chunks to a local cache;
      encrypting one or more of the data chunks and transferring the one or more encrypted data chunks to the one or more remote storage devices;
      using the associated fingerprints, managing a hash table to map physical storage locations of the data chunks;
      executing a de-duplication algorithm to discover redundant data chunks in both the local cache and the one or more remote storage devices;

based on results of the executed de-duplication algorithm, deleting the redundant data chunks from the local cache and the one or more remote storage devices;

receiving an access request from the one or more compute blades to access a specified data chunk;

in response to receiving the access request, utilizing the hash table to determine whether the specified data chunk is located in the local cache; and in response to determining that the specified data chunk is not in the local cache, retrieving the specified data chunk from the one or more remote storage devices.

2. The storage system of claim 1, wherein the one or more memory blades operate as a staging appliance between the one or more compute blades and the one or more remote storage devices, and wherein the one or more remote storage devices are included in a public storage system.

3. The storage system of claim 1, wherein the memory controller is further to compress the one or more encrypted data chunks prior to transferring the one or more encrypted data chunks to the one or more remote storage devices.

4. The storage system of claim 1, wherein the memory controller includes at least one of a general-purpose processor, graphical processing unit, a FPGA-based design, or an ASIC located in the one or more memory blades.

5. The storage system of claim 1, wherein generating the associated fingerprints for the data chunks includes execution of one or more hashing algorithms, and wherein the memory controller includes a hardware accelerator that performs the operations for the one or more compute blades.

6. The storage system of claim 1, wherein the memory controller is to perform further operations comprising:

storing most recently used data chunks in the local cache; and in response to retrieving the specified data chunk from the one or more remote storage devices, storing the specified data chunk in the local cache.

7. The storage system of claim 1, wherein the memory blade utilizes a hypervisor to isolate the memory controller from local programs of the storage device.

8. A method for managing data, the method being performed by one or more processors of a memory blade in communication with one or more compute blades and one or more remote storage devices, the method comprising:

receiving data chunks from the one or more compute blades;

generating associated fingerprints for the data chunks;

compressing one or more of the data chunks and transferring the one or more compressed data chunks to a local cache;

encrypting one or more of the data chunks and transferring the one or more encrypted data chunks to the one or more remote storage devices;

using the associated fingerprints, managing a hash table to map physical storage locations of the data chunks;

executing a de-duplication algorithm to discover redundant data chunks in both the local cache and the one or more remote storage devices;

based on results of the executed de-duplication algorithm, deleting the redundant data chunks from the local cache and the one or more remote storage devices;

receiving an access request from the one or more compute blades to access a specified data chunk;

in response to receiving the access request, utilizing the hash table to determine whether the specified data chunk is located in the local cache; and in response to determining that the specified data chunk is not in the local cache, retrieving the specified data chunk from the one or more remote storage devices.

9. The method of claim 8, wherein the memory blade operates as a staging appliance between the one or more compute blades and the one or more remote storage devices, and wherein the one or more remote storage devices are included in a public storage system.

10. The method claim 8, wherein the memory blade is further to compress the one or more encrypted data chunks prior to transferring the one or more encrypted data chunks to the one or more remote storage devices.

11. The method of claim 8, wherein the memory blade includes at least one of a general-purpose processor, graphical processing unit, a FPGA-based design, or an ASIC located in the memory blade.

12. The method of claim 8, wherein generating the associated fingerprints for the data chunks includes execution of one or more hashing algorithms, and wherein the memory blade includes a hardware accelerator that performs the method for the one or more compute blades.

13. The method of claim 8, further comprising:

storing most recently used data chunks in the local cache; and in response to retrieving the specified data chunk from the one or more remote storage devices, storing the specified data chunk in the local cache.

14. The method of claim 8, wherein the memory blade utilizes a hypervisor to isolate the one or more processors of the memory blade from local programs of the one or more compute blades.

* * * * *